(12) United States Patent
Kocher et al.

(10) Patent No.: US 9,879,689 B2
(45) Date of Patent: Jan. 30, 2018

(54) TURBOCHARGER ROTATING ASSEMBLY

(71) Applicant: Honeywell International Inc., Morristown, NJ (US)

(72) Inventors: Ryan Matthew Kocher, San Pedro, CA (US); Corazon Maynigo, Torrance, CA (US); Glenn F. Thompson, Palos Verdes Estates, CA (US)

(73) Assignee: Honeywell International Inc., Morris Plains, NJ (US)

( * ) Notice: Subject to any disclaimer, the term of this patent is extended or adjusted under 35 U.S.C. 154(b) by 475 days.

(21) Appl. No.: 14/569,754

(22) Filed: Dec. 14, 2014

(65) Prior Publication Data

US 2015/0098800 A1   Apr. 9, 2015

Related U.S. Application Data

(63) Continuation of application No. 13/237,407, filed on Sep. 20, 2011, now Pat. No. 8,911,202.

(51) Int. Cl.
| | |
|---|---|
| *F04D 29/10* | (2006.01) |
| *F01D 25/18* | (2006.01) |
| *F02C 6/12* | (2006.01) |
| *F01D 25/14* | (2006.01) |
| *F16C 35/077* | (2006.01) |

(Continued)

(52) U.S. Cl.
CPC ........... *F04D 29/102* (2013.01); *F01D 25/14* (2013.01); *F01D 25/18* (2013.01); *F02B 37/00* (2013.01); *F02C 6/12* (2013.01); *F04D 29/668* (2013.01); *F16C 35/077* (2013.01);

(Continued)

(58) Field of Classification Search
CPC .... F04D 29/102; F04D 29/668; F04D 29/046; F04D 29/0462; F04D 29/049; F04D 29/056; F04D 29/0563; F02B 37/00; F16C 35/077; F16C 2360/24; F16C 19/184;

(Continued)

(56) References Cited

U.S. PATENT DOCUMENTS 3,186,779 A * 6/1965 Chapman ............... F01D 25/164
                                                       384/535
4,721,441 A   1/1988 Miyashita et al.
(Continued)

FOREIGN PATENT DOCUMENTS

WO   2011/057945 A1   5/2011

OTHER PUBLICATIONS

EP Application No. 12184568.9 - 1607 / 2573362, European Search Report of Nov. 23, 2017 (3 pages).

*Primary Examiner* — Gregory Anderson
*Assistant Examiner* — Eldon Brockman
(74) *Attorney, Agent, or Firm* — Brian J. Pangrle

(57) ABSTRACT

A system can include a shaft and turbine wheel assembly that includes a seal portion; a bearing assembly that includes an outer race and rolling elements that rotatably support the shaft and turbine wheel assembly; a sleeve that includes an outer diameter and a through bore that includes a first inner diameter that accommodates an outer diameter of the outer race of the bearing assembly and a second, smaller inner diameter that accommodates an outer diameter of the seal portion of the shaft and turbine wheel assembly; and a center housing that includes a compressor side, a turbine side and a bore that includes a turbine side bore diameter that accommodates the outer diameter of the sleeve.

13 Claims, 8 Drawing Sheets

(51) Int. Cl.
    *F02B 37/00*     (2006.01)
    *F04D 29/66*     (2006.01)
    *F16C 19/18*     (2006.01)

(52) U.S. Cl.
    CPC ........ *F16C 19/184* (2013.01); *F16C 2360/24* (2013.01); *Y10T 29/4932* (2015.01)

(58) Field of Classification Search
    CPC . F01D 25/14; F01D 25/18; F02C 6/12; Y10T 29/4932
    See application file for complete search history.

(56) References Cited

U.S. PATENT DOCUMENTS

| | | | | |
|---|---|---|---|---|
| 5,076,766 | A * | 12/1991 | Gutknecht | F01D 25/164 184/6.11 |
| 5,145,334 | A * | 9/1992 | Gutknecht | F01D 25/164 417/407 |
| 7,104,693 | B2 * | 9/2006 | Mavrosakis | F01D 25/164 384/99 |
| 7,214,037 | B2 * | 5/2007 | Mavrosakis | F01D 25/16 384/474 |
| 2003/0072509 | A1 * | 4/2003 | Woollenweber | F01D 25/164 384/490 |
| 2007/0134106 | A1 | 6/2007 | McKeirnan, Jr. | |

* cited by examiner

TURBOCHARGER ROTATING ASSEMBLY

RELATED APPLICATIONS

This application is a continuation of a co-pending U.S. patent application having Ser. No. 13/237,407, filed 20 Sep. 2011, which is incorporated by reference herein.

TECHNICAL FIELD

Subject matter disclosed herein relates generally to turbomachinery for internal combustion engines and, in particular, to rotating assemblies.

BACKGROUND

Exhaust driven turbochargers include a rotating group that includes a turbine wheel and a compressor wheel that are connected to one another by a shaft. The shaft is typically rotatably supported within a center housing by one or more bearings (e.g., oil lubricated, air bearings, ball bearings, magnetic bearings, etc.). During operation, exhaust from an internal combustion engine drives a turbocharger's turbine wheel, which, in turn, drives the compressor wheel to boost charge air to the internal combustion engine.

During operation, a turbocharger's rotating group must operate through a wide range of speeds. Depending on factors such as size of the turbocharger, the maximum speed reached may be in excess of 200,000 rpm. A well balanced turbocharger rotating group is essential for proper rotordynamic performance. Efforts to achieve low levels of unbalance help to assure shaft stability and minimize rotor deflection which in turn acts to reduce bearing loads. Reduced bearing loads result in improved durability and reduced noise (e.g., as resulting from transmitted vibration).

To reduce vibration, turbocharger rotating group balancing includes component and assembly balancing. Individual components such as the compressor and turbine wheel assembly are typically balanced using a low rotational speed process while an assembly is typically balanced using a high speed balancing process. In general, such an assembly includes a housing (e.g., a center housing) and is referred to as a center housing and rotating assembly (CHRA).

Various balancing concerns stem from CHRA design, particularly characteristics of components that can dictate order of assembly. For example, many center housings are configured to receive a bearing via a compressor side opening and to receive a shaft via a turbine side opening. In such configurations, it makes sense to balance the shaft and the bearing once they are properly positioned in a center housing (e.g., as a CHRA). In other words, balancing a shaft and a bearing as an assembly (e.g., set in a jig) prior to insertion into the center housing does not necessarily ensure proper balance once these components are inserted into the center housing to form a CHRA. For example, where a press-fit is required between a race or rolling elements of a bearing and the shaft, it can be difficult to un-press-fit, insert in the components into center housing and re-press-fit the bearing and the shaft while achieving an exact realignment.

Various technologies described herein pertain to assemblies that include a sleeve where the sleeve may be, for example, configured to support a bearing and shaft subassembly and to fit into a center housing. Such an approach can optionally facilitate balancing, minimize balance-related noise, vibration and harshness (NVH), etc. Such an approach may enhance stocking, manufacturing, inspection, maintenance, repair, and replacement (e.g., with components having same or different characteristics).

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

As described herein, a sleeve can include a compressor end and a turbine end, a bore extending axially from the compressor end to the turbine end, a first counter bore that forms an axial face to axially locate a bearing in the bore, a second counter bore disposed axially between the first counter bore and the turbine end where the second counter bore includes a seal surface to form a lubricant and exhaust seal with a seal ring disposed about a shaft supported by a bearing, and a securing feature to secure the sleeve with respect to a turbocharger housing.

As described herein, such a sleeve can provide for best practice high-volume manufacturing, optionally using conventional techniques. In other words, in a manufacturing process, a turbocharger rotating assembly that includes such a sleeve may be introduced while accommodating existing, in-place manufacturing techniques.

As described herein, a sleeve can provide for increased manufacturing yield for rotating element bearing rotor groups (e.g., ball bearings, or other types of rolling element bearings). Use of a sleeve can allow for pre-assembly of various components, which, in turn, can enhance the benefits of balancing, for example, to minimize balance-related noise, vibration, and harshness (NVH). In general, such a sleeve may ease balancing costs, time, etc., for preassembled rotating element bearing rotor groups.

As described herein, a sleeve-based approach can diversify range of turbocharger rotating element bearings and seals, for example, for aerodynamic applications. A sleeve-based approach can enable rolling element bearing and rotor group seal sizing to be designed independently from rolling element bearing diametral envelope size. For example, a sleeve-based approach can optionally permit use of a pre-assembled ball bearing and rotor group with any and all sizes of ball bearings or ball-on-shaft designs and seals. As described herein, a bearing and turbine seal bore insert can be its own fixture for pre-balance operations. Further, a sleeve-based approach can provide for rolling element bearing re-use, inspection, maintenance, replacement, etc. As described herein, a sleeve-based approach can result in reductions in development time, test trial time, stocking time, part tracking time, assembly time, inspection time, maintenance time, replacement time, etc.

Below, an example of a turbocharged engine system is described followed by various examples of components, assemblies, methods, etc.

Figure 1:
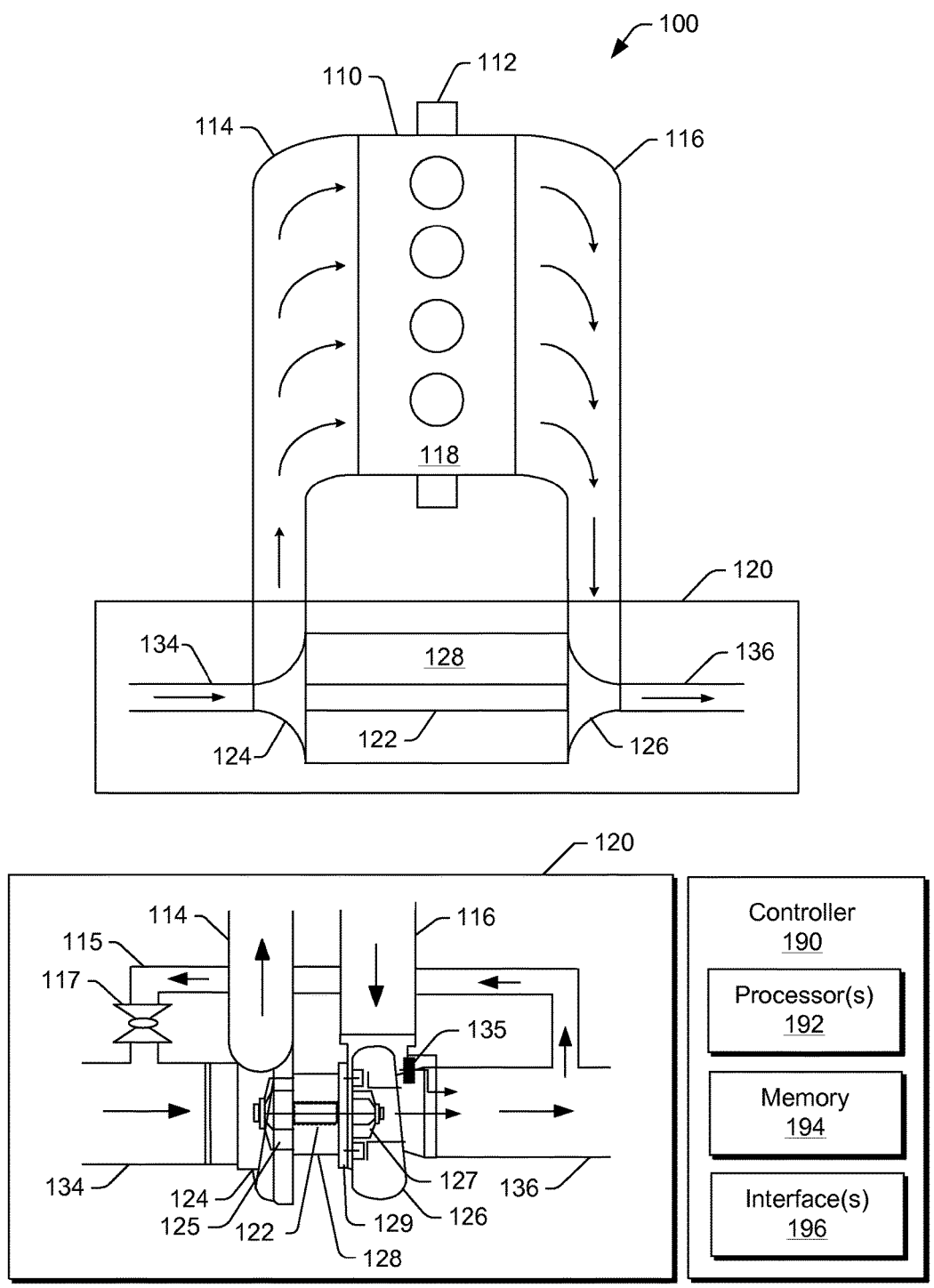
FIG. 1 is a diagram of a turbocharger and an internal combustion engine along with a controller.

Turbochargers are frequently utilized to increase output of an internal combustion engine. Referring to FIG. 1, a conventional system 100 includes an internal combustion engine 110 and a turbocharger 120. The internal combustion engine 110 includes an engine block 118 housing one or more combustion chambers that operatively drive a shaft 112 (e.g., via pistons). As shown in FIG. 1, an intake port 114 provides a flow path for air to the engine block 118 while an exhaust port 116 provides a flow path for exhaust from the engine block 118.

Also shown in FIG. 1, the turbocharger 120 includes an air inlet 134, a shaft 122, a compressor 124, a turbine 126, a housing 128 and an exhaust outlet 136. The housing 128 may be referred to as a center housing as it is disposed between the compressor 124 and the turbine 126. The shaft 122 may be a shaft assembly that includes a variety of components. In operation, the turbocharger 120 acts to extract energy from exhaust of the internal combustion engine 110 by passing the exhaust through the turbine 126. As shown, rotation of a turbine wheel 127 of the turbine 126 causes rotation of the shaft 122 and hence a compressor wheel 125 (e.g., impeller) of the compressor 124 to compress and enhance density of inlet air to the engine 110. By introducing an optimum amount of fuel, the system 100 can extract more specific power out of the engine 100 (e.g., compared to a non-turbocharged engine of the same displacement). As to control of exhaust flow, in the example of FIG. 1, the turbocharger 120 includes a variable geometry unit 129 and a wastegate valve 135. The variable geometry unit 129 may act to control flow of exhaust to the turbine wheel 127. The wastegate valve (or simply wastegate) 135 is positioned proximate to the inlet of the turbine 126 and can be controlled to allow exhaust from the exhaust port 116 to bypass the turbine wheel 127.

Further, to provide for exhaust gas recirculation (EGR), such a system may include a conduit to direct exhaust to an intake path. As shown in the example of FIG. 1, the exhaust outlet 136 can include a branch 115 where flow through the branch 115 to the air inlet path 134 may be controlled via a valve 117. In such an arrangement, exhaust may be provided upstream of the compressor 124.

In FIG. 1, an example of a controller 190 is shown as including one or more processors 192, memory 194 and one or more interfaces 196. Such a controller may include circuitry such as circuitry of an engine control unit. As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate, an exhaust gas recirculation valve, an electric motor, or one or more other components associated with an engine, a turbocharger (or turbochargers), etc.

Figure 2:
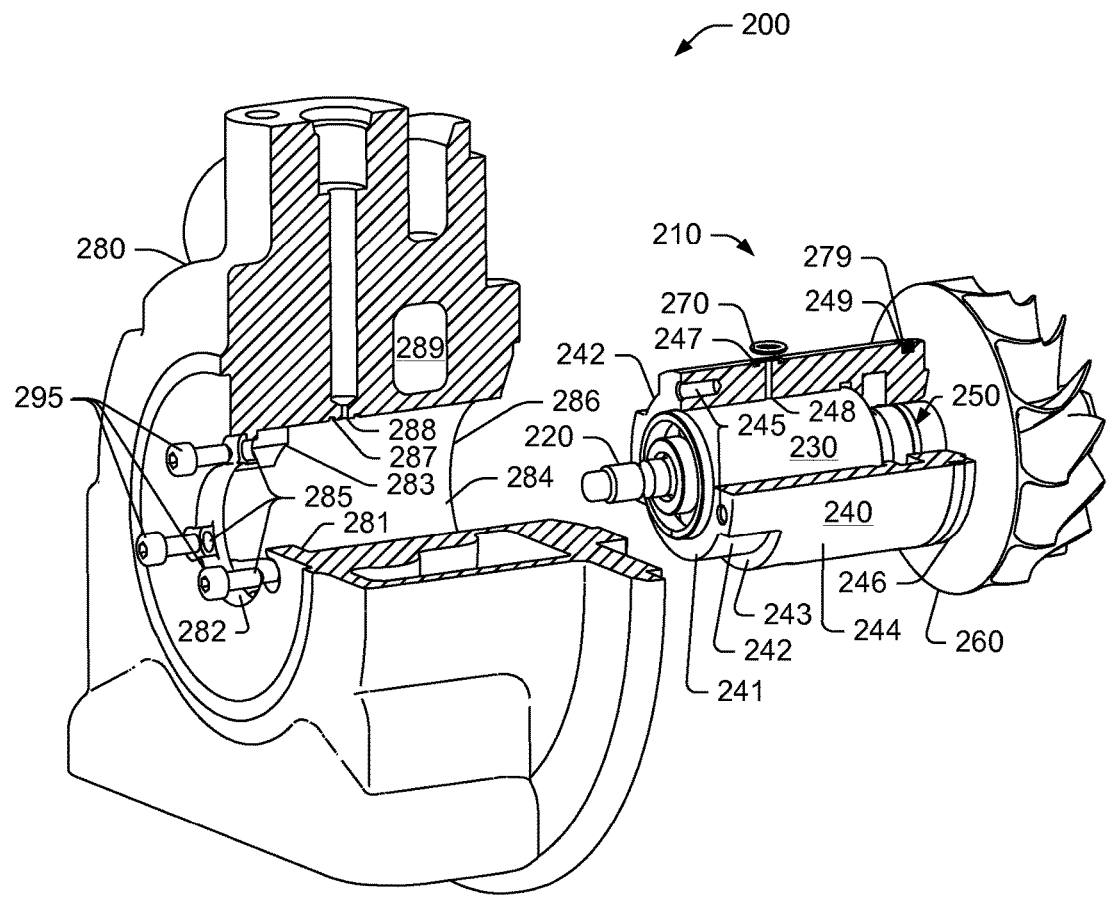
FIG. 2 is a sectional exploded view of an example of a turbocharger rotational assembly that includes an example of a sleeve.

FIG. 2 shows an example of a turbocharger rotating assembly 200 that includes a shaft 220 supported by a bearing 230 disposed in a sleeve 240, which may be inserted into a housing 280. As shown in the example of FIG. 2, the shaft 220 extends to a turbine wheel 260 to form a shaft and wheel assembly (SWA) and a region that includes a seal mechanism 250 between the shaft 220 and the sleeve 240.

In the example of FIG. 2, the sleeve 240 includes an axial face 241 at a compressor end, one or more recessed outer surfaces 242, one or more recessed axial faces 243, an outer surface 244 and an axial face 246 at a turbine end. The axial face 241 at the compressor end includes various securing features 245, which may be, for example, threaded sockets. The sleeve 240 further includes, disposed between the compressor end and the turbine end, an annular groove 247 to seat a seal component 270 (e.g., an O-ring) about a lubricant passage 248 and an annular groove 249 to seat a seal component 279 (e.g., a seal ring such as a piston ring).

As to the housing 280, it includes various features that allow for receipt of the sleeve 240 with the SWA (e.g., shaft 220 and turbine wheel 260). In the example of FIG. 2, the housing 280 includes an axial face 281 formed by a counterbore 282 at a compressor end. Adjacent to the counterbore 282 are one or more partial counterbores 283, for example, that extend axially inwardly from the axial face 281 into a main bore 284. As shown, the main bore 284 extends from the counterbore 282 to an axial face 286 at a turbine end of the housing 280. Disposed along the main bore 284 is an annular groove 287 to seat a seal component (e.g., the seal component 270) about a lubricant passage 288. Further, the housing 280 may include various cooling passages 289, for example, to allow for transfer of heat energy away from the bore 284. Also, at the compressor end of the housing 280, securing features 285 exist for receipt of respective bolts 295.

As to cooperative features, the one or more recesses of the axial face 241 of the sleeve 240, as defined by the one or more recessed outer surfaces 242, may be oriented with respect to the one or more partial counterbores 283 of the housing 280, for example, to allow the securing features 245 to align with the securing features 285 for insertion of bolts 295 to thereby secure the sleeve 240 with respect to the housing 280. In such an example, the one or more partial counterbores 283 and the one or more recesses of the axial face 241 limit rotation of the sleeve 240 in the main bore 284 of the housing 280, whether or not the bolts 295 are inserted. Accordingly, rotational forces transmitted to the sleeve 240 may be applied to the one or more partial counterbores 283, which can reduce or prevent transmission of forces that could compromise the bolts 295 or the securing features 245 or 285 in a manner that could make disassembly difficult (e.g., bent bolts, stripped threads, etc.).

In the example of FIG. 2, cooperation can also exist between the groove 247 of the sleeve 240 and the groove 287 of the housing 280. Such an approach can help avoid misdirection of lubricant between the passages 248 and 288, generally to occur from the passage 288 to the passage 248. Further, the seal component 279 as seated in the groove 249 of the sleeve 240 can reduce transmission of exhaust from a turbine and transmission of lubricant, for example, given leakage of the seal component 270 or absence of such a seal component. While the example of FIG. 2 shows an annular groove in the sleeve 240, alternatively, or additionally, such a groove may be present in the main bore 284 of the housing 280. Further, while both the sleeve 240 and the housing 280 are shown as including grooves for seating the seal component 270, a groove in one of these components alone may be sufficient to seat a seal component.

Figure 3:
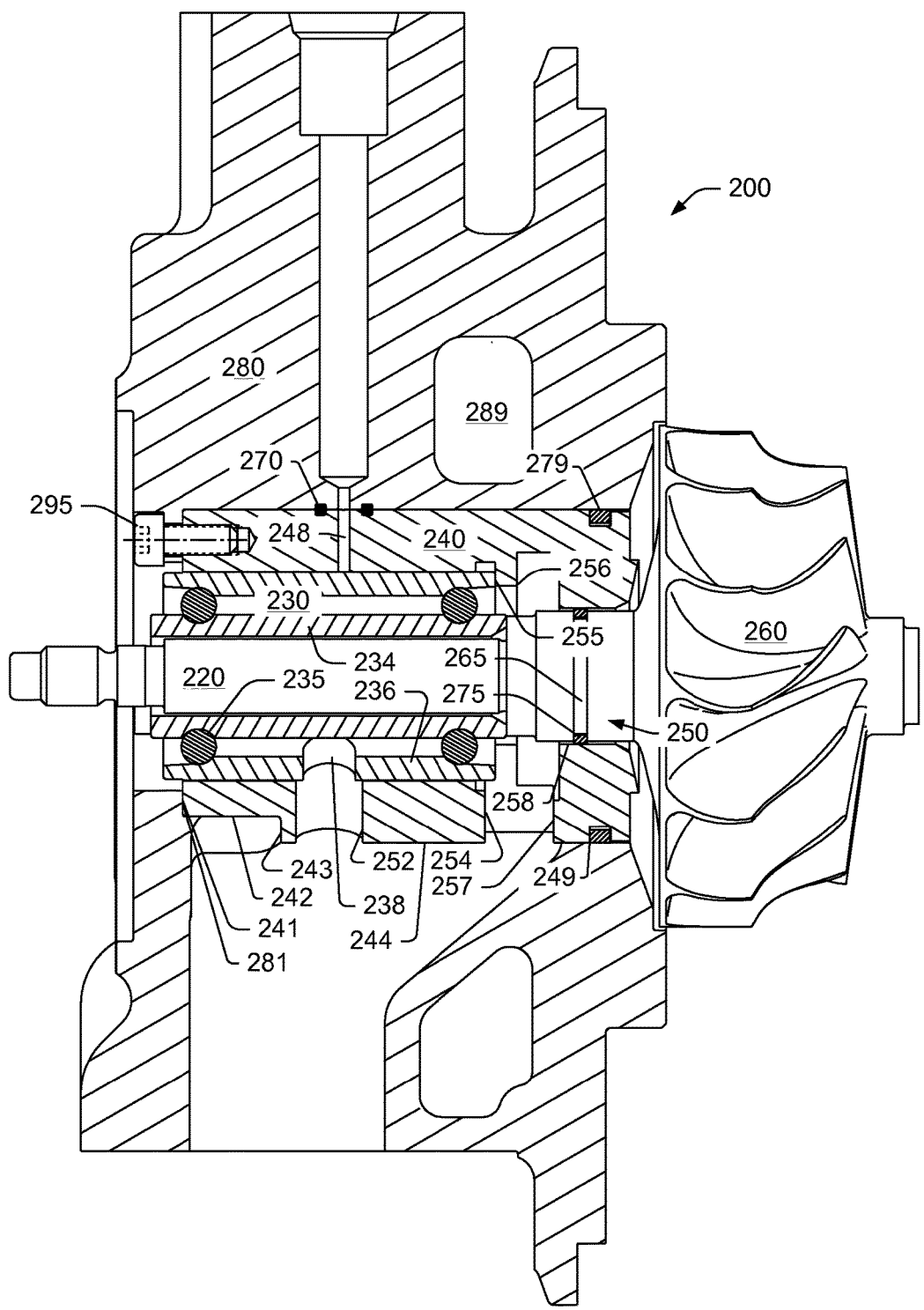
FIG. 3 is a cross-sectional view of the assembly of FIG. 2.

FIG. 3 shows a cross-sectional view of the assembly 200 of FIG. 2 with the bearing 230 received by the sleeve 240 and the sleeve 240 received by the housing 280. In the particular cross-sectional view, the axial face 241 of the sleeve 240 abuts the axial face 281 of the housing 280. Further, various features of the seal mechanism 250 are shown.

As to the bearing 230, it includes an inner race 234, rolling elements 235 and an outer race 236, which may include a lubricant opening 238. As shown, the shaft 220 is press-fit onto the inner race 234; accordingly, the shaft 220 and the inner race 234 rotate as a unit about the outer race 236, which may optionally be fixed or otherwise limited in its ability to rotate within the sleeve 240 (e.g., via a locating or anti-rotation feature such as a pin). With respect to axial position of the bearing 230, the outer race 236 is axially located by an axial face 255 of a counterbore 256 of the sleeve 240.

In the example of FIG. 3, the sleeve 240 also includes a lubricant passage 252, which may have a larger cross-sectional area than the lubricant passage 248. Further, an opening exists between an axial face 254 and an axial face 257, which may provide for drainage of lubricant.

As to the seal mechanism 250, it may include a surface formed by a counterbore 258 of the sleeve 240, an annular groove 265 in a portion of the shaft 220 and a seal component 275 seated at least partially in the groove 265. As mentioned, another seal may be formed along the outer surface 244 of the sleeve 240 via a groove 249 and a seal component 279 seated at least partially in the groove 249. Such a seal may act to reduce exhaust traveling in a direction toward the compressor and mixing with lubricant. Accordingly, as described herein, an assembly may include a concentric arrangement of seals that act to reduce passage of exhaust from an exhaust region of a turbocharger to one or more bores (e.g., a bore of a sleeve and a bore of a housing). In such an example, one seal is about a rotating component (i.e., the shaft) and the other seal is about a stationary component (i.e., the sleeve).

In general, a seal about a rotating component may be more difficult to maintain and may be made with dimensions to minimize flow area, etc. Further, while single seals are shown in the example of FIG. 3, the seal between the sleeve 240 and the housing 280 or the seal between the shaft 220 and the sleeve 240 may rely on multiple grooves, seal components, etc. Yet further, both may rely on multiple grooves, seal components, etc. (e.g., to form labyrinths, etc.).

Figure 4:
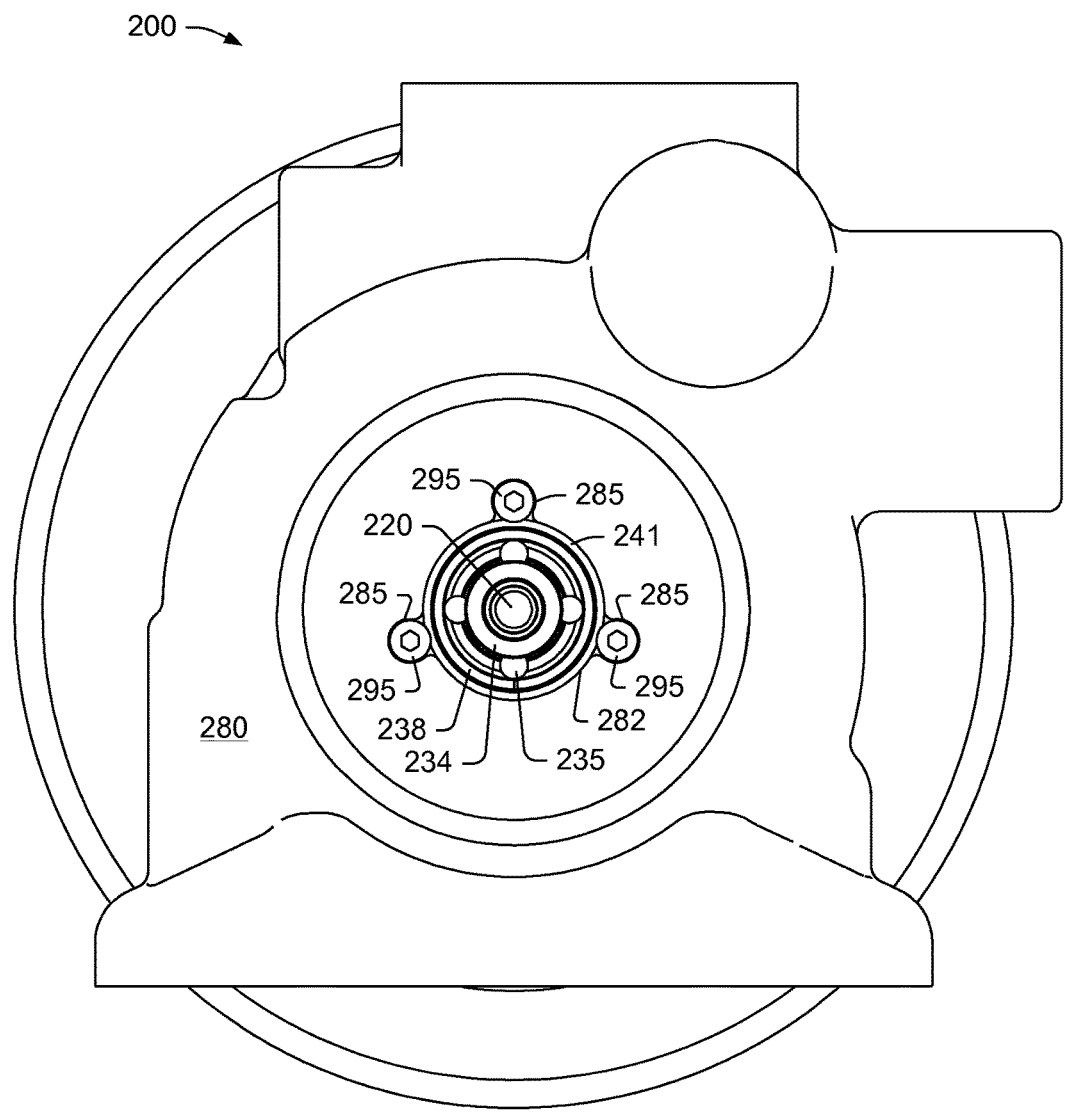
FIG. 4 is a compressor end view of the assembly of FIG. 3.

FIG. 4 shows a compressor end view of the assembly 200 of FIGS. 2 and 3. In the example of FIG. 4, three bolts 295 are inserted into three openings 285 to secure the sleeve 240 in the housing 280.

As described herein, a turbocharger rotating assembly can include a bearing; a shaft and turbine wheel assembly supported by the bearing; a seal ring disposed about the shaft; and a sleeve that supports the bearing and that includes a compressor end and a turbine end, a bore extending axially from the compressor end to the turbine end, a first counter bore that forms an axial face that axially locates the bearing in the bore, a second counter bore disposed axially between the first counter bore and the turbine end where the second counter bore includes a seal surface that forms a lubricant and exhaust seal with the seal ring disposed about the shaft, and a securing feature to secure the sleeve with respect to a turbocharger housing. In such an assembly, the bearing, as axially located in the bore of the sleeve, may extend outward axially from the compressor end. As to a securing feature of a sleeve, one or more sockets may be disposed along an axial face of the sleeve at the compressor end. Further, a housing may include a socket disposed at a compressor end that aligns with a socket of a sleeve (e.g., for passing an end of a bolt). As described herein, a sleeve can optionally include an annular groove about an outer surface and a seal ring disposed in the annular groove (e.g., to form a seal between the sleeve and a bore of a housing in which the sleeve is to be inserted).

Figure 5:
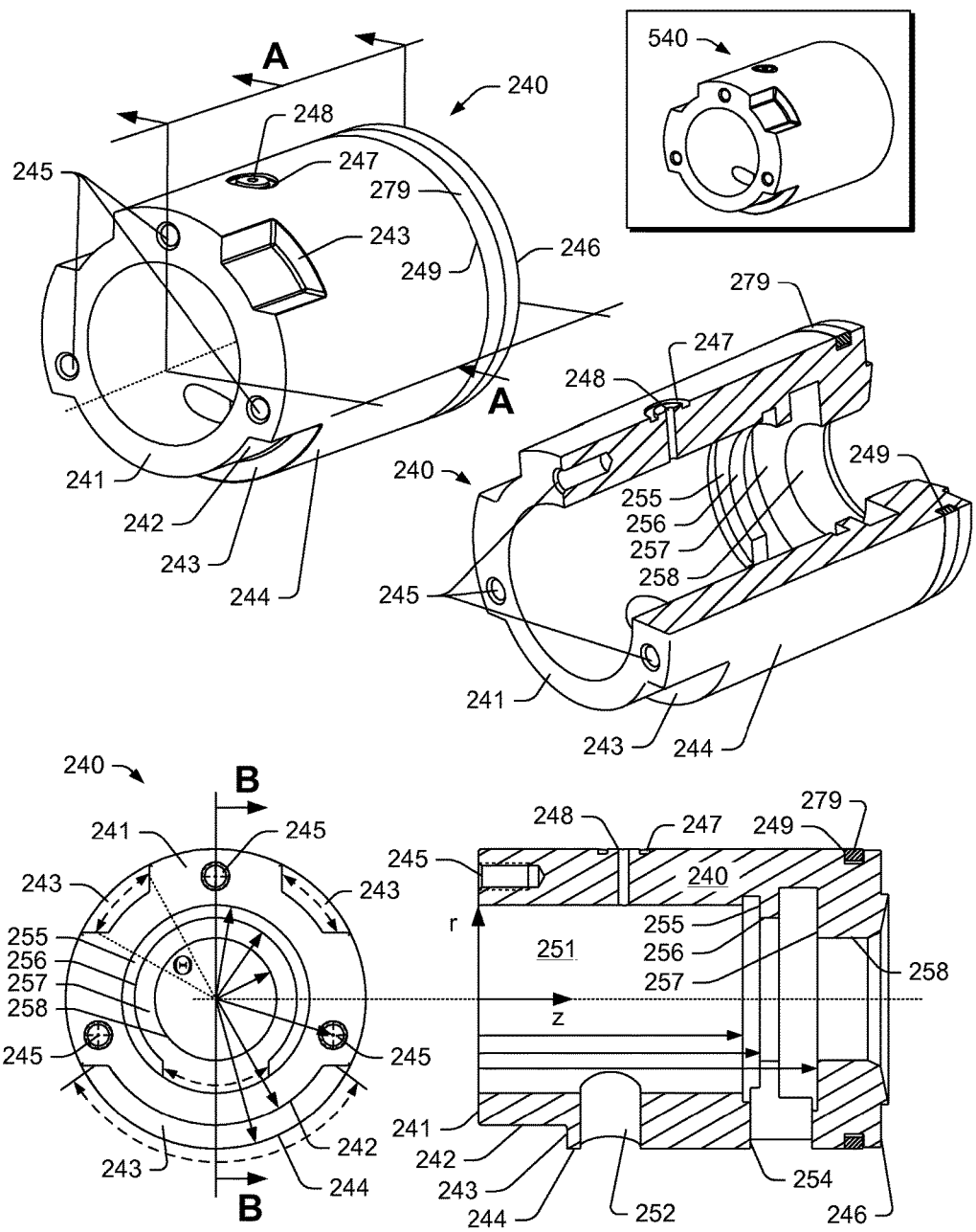
FIG. 5 is a series of views of the example of the sleeve of FIGS. 2, 3, and 4 and another example of a sleeve.

FIG. 5 shows various views of the sleeve 240, as shown in the examples of FIGS. 2, 3 and 4. Specifically, FIG. 5 shows a perspective view of the sleeve 240, a cross-sectional view of the sleeve 240 along a line A-A, a compressor end view of the sleeve 240 and a cross-sectional view of the sleeve 240 along a line B-B. Also shown in FIG. 5 is a perspective view of an example of a sleeve 540 that does not include the groove 249 and, accordingly, the seal component 279. As described herein, various features of a sleeve may be optional.

In the compressor end view of the sleeve 240, various radii are shown as extending from a z-axis as well as azimuthal angles about the z-axis. As shown, a radius of the counterbore 258 is less than a radius of the counterbore 256, which is less than a radius of a bore 251. Further, a radius of the recessed outer surface 242 is less than a radius of the outer surface 244. Yet further, in the example of FIG. 5, various recesses 243 may be definable, in part, by respective azimuthal angles.

As to axial dimensions, the cross-sectional view along the line B-B shows axial distances from the axial face 241 to an end of the bore 251, to the axial face 255 and to the axial face 257.

Figure 6:
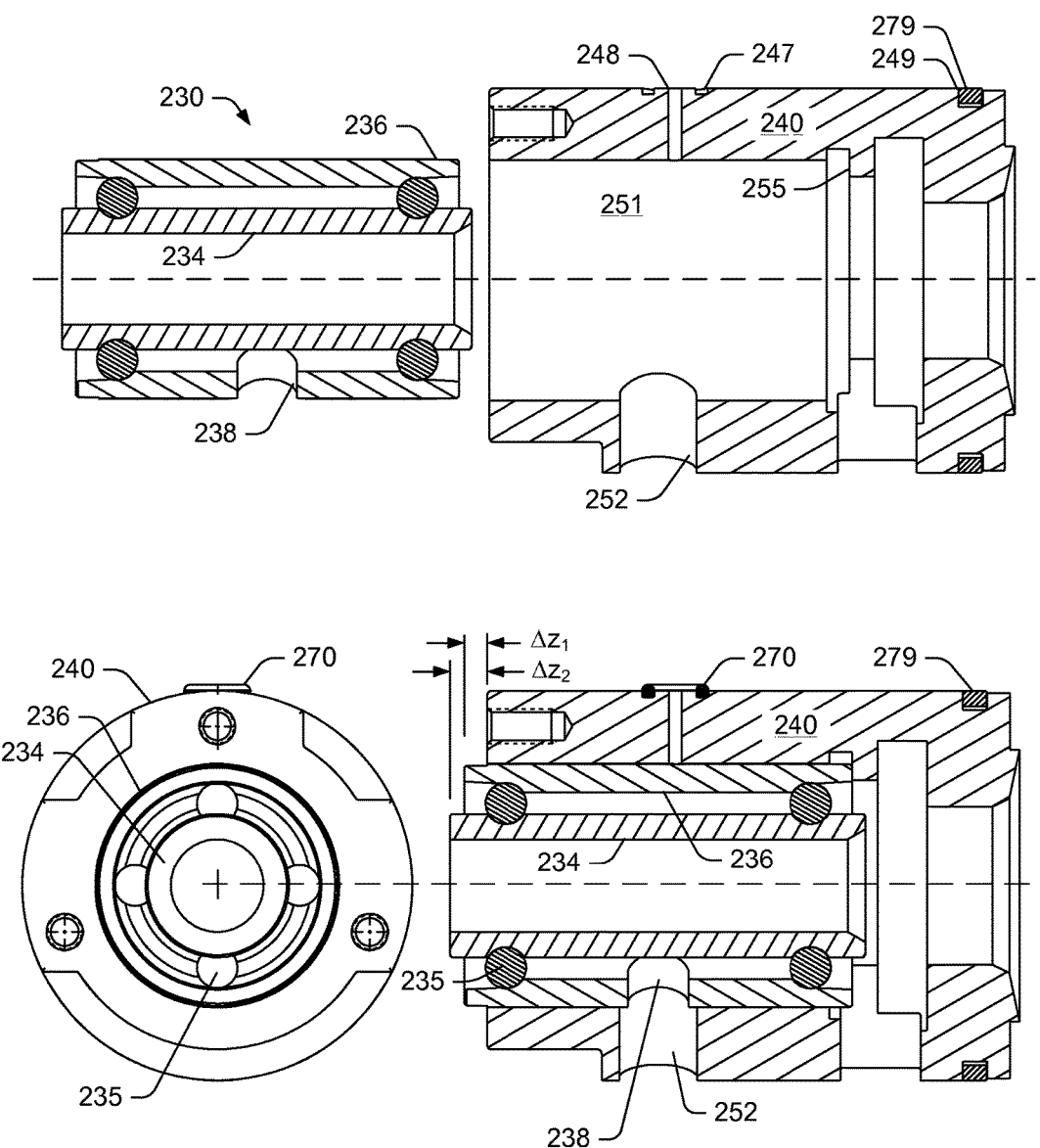
FIG. 6 is a series of views of components and a subassembly of the assembly of FIGS. 2, 3 and 4.

FIG. 6 shows cross-sectional views of the bearing 230 (e.g., a bearing cartridge) and the sleeve 240, as separate components and as an assembly with the seal component 270, together with a compressor end view of the assembly with the seal component 270.

In the cross-sectional view of the assembly, axial dimensions $\Delta z_1$ and $\Delta z_2$ are shown with respect to the compressor end of the bearing 230 and the compressor end of the sleeve 240. These dimensions depend on characteristics of the bearing 230 and the sleeve 240. Specifically, the axial face 255 acts to axially locate the bearing 230 in the sleeve 240 and thereby may dictate extent of overhang. Overhang may depend on features of a turbocharger assembly such as thrust collar features, compressor backplate features, etc.

As described herein, a bearing may include one or more openings that allow for passage of lubricant, for example, with respect to the sleeve 240, from the passage 248 to shaft space, which may include one or more rolling elements (see, e.g., the balls 235).

Figure 7:
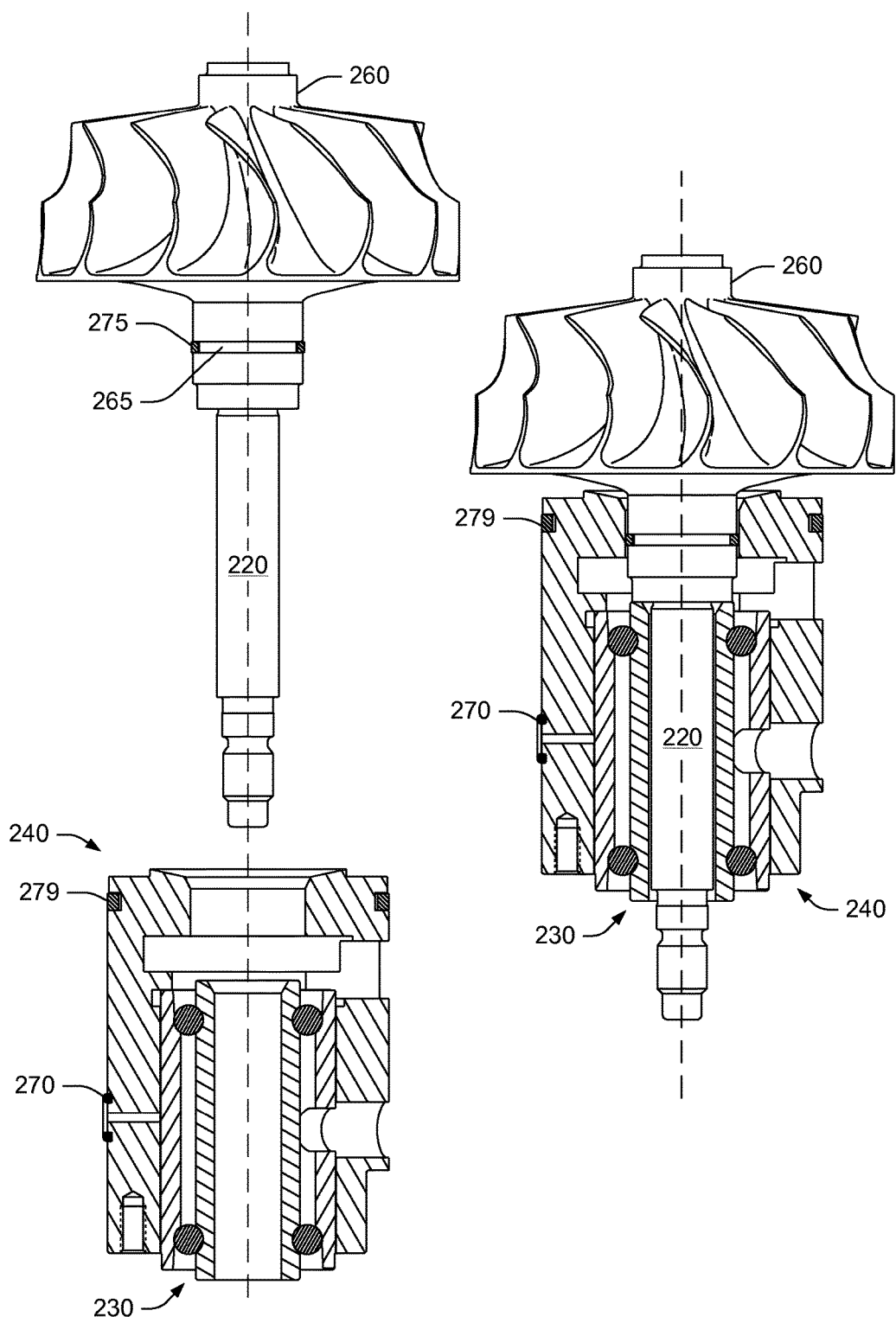
FIG. 7 is a series of views of components, a subassembly and a turbocharger rotational assembly.

FIG. 7 shows cross-sectional views of the shaft 220 with the wheel 260, the bearing 230 and the sleeve 240. As indicated, a compressor end of the shaft 220 is inserted into the bearing 230, as it is supported in the sleeve 240, to form a turbocharger rotating assembly.

As described herein, such an assembly may be balanced and then placed in a housing. Further, if some amount of unbalance is experienced (e.g., due to noise, vibration, etc.) after operation of a turbocharger, a compressor wheel may be removed from a compressor end of a shaft and access provided to any securing features that may secure a sleeve in a center housing to thereby allow for removal of the sleeve/bearing/SWA assembly. The assembly may then be subject to balancing or other inspection, maintenance, etc., and, if appropriate, reinstalled into the center housing.

Figure 8:
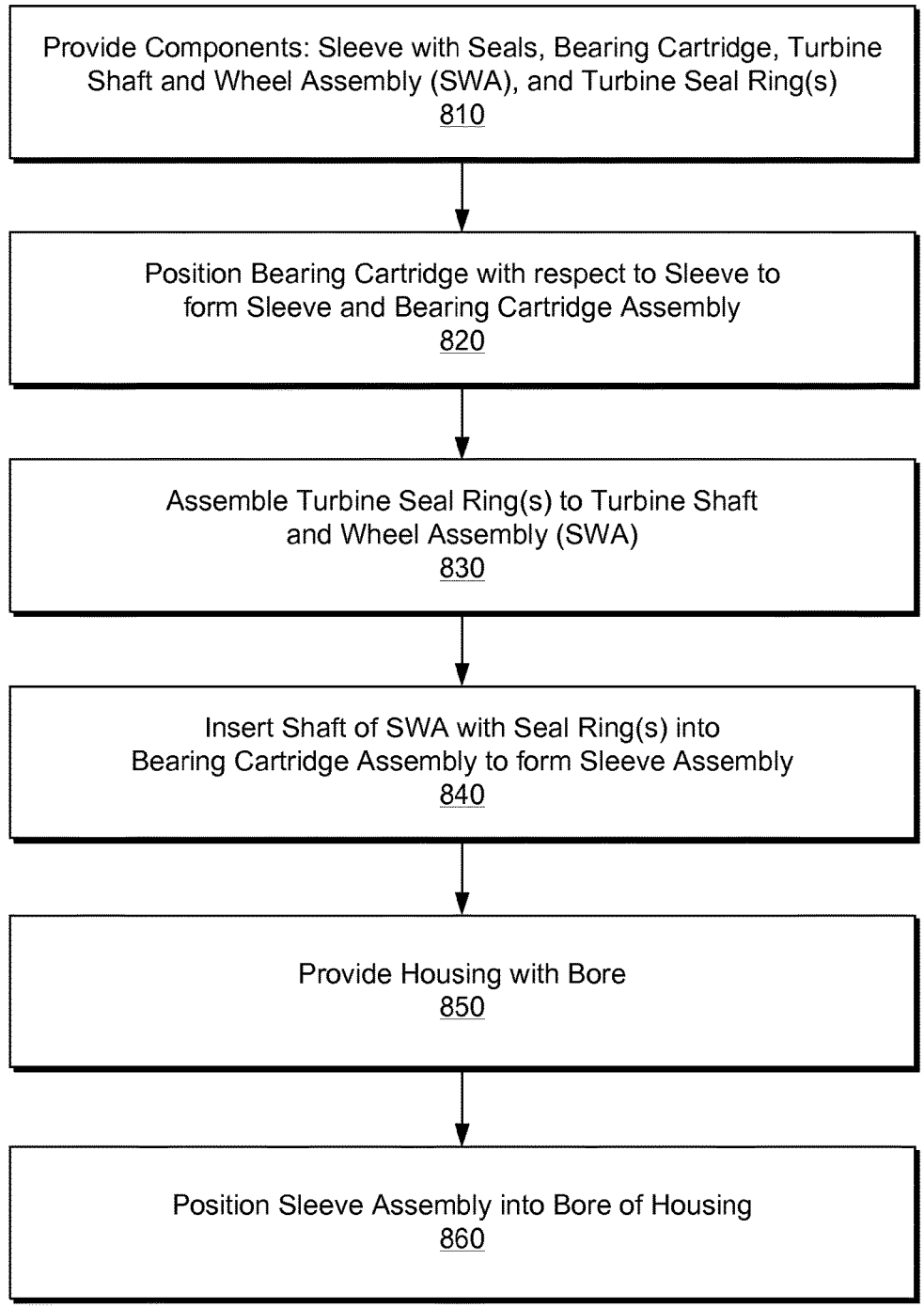
FIG. 8 is a block diagram of an example of a method to form various assemblies.

FIG. 8 shows a block diagram of an example of a method 800 that includes a provision block 810 for providing a sleeve with seal components, a bearing cartridge, a turbine shaft and wheel assembly, and a turbine seal ring (or rings); a position block 820 for positioning the bearing cartridge with respect to sleeve to form a sleeve and bearing cartridge assembly; an assembly block 830 for assembling the turbine seal ring (or rings) to the turbine shaft and wheel assembly; and an insertion block 840 for inserting the shaft of shaft and turbine wheel assembly with the seal ring (or rings) into the bearing cartridge assembly to form a sleeve assembly. In the example of FIG. 8, the method 800 can further include a provision block 850 for providing a housing with a bore; and a position block 860 for positioning the sleeve assembly into the bore of the housing.

As described herein, positioning a sleeve assembly into a bore of a housing can form a seal (e.g., with one of multiple seal components) between the bore and the sleeve about a lubricant passage of the sleeve and form another seal, (e.g., with another one of the multiple seal components) between the sleeve and the bore of the housing (e.g., where the housing, sleeve or both may include features to seat a seal component or components).

As described herein, various acts may be performed by a controller (see, e.g., the controller 190 of FIG. 1), which may be a programmable control configured to operate according to instructions. As described herein, one or more computer-readable media may include processor-executable instructions to instruct a computer (e.g., controller or other computing device) to perform one or more acts described herein. A computer-readable medium may be a storage medium (e.g., a device such as a memory chip, memory card, storage disk, etc.). A controller may be able to access such a storage medium (e.g., via a wired or wireless interface) and load information (e.g., instructions and/or other information) into memory (see, e.g., the memory 194 of FIG. 1). As described herein, a controller may be an engine control unit (ECU) or other control unit. Such a controller may optionally be programmed to control lubricant flow to a turbocharger, lubricant temperature, lubricant pressure, lubricant filtering, exhaust gas recirculation, etc.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions without departing from the spirit set forth and defined by the following claims.

What is claimed is:

1. A system comprising:
    a shaft and turbine wheel assembly that comprises a seal portion;
    a bearing assembly that comprises an outer race and rolling elements that rotatably support the shaft and turbine wheel assembly;
    a sleeve that comprises an outer diameter and a through bore that comprises a first inner diameter that accommodates an outer diameter of the outer race of the bearing assembly and a second, smaller inner diameter that accommodates an outer diameter of the seal portion of the shaft and turbine wheel assembly; and
    a center housing that comprises a compressor side, a turbine side and a bore that comprises a turbine side bore diameter that accommodates the outer diameter of the sleeve wherein the bore of the center housing comprises a compressor side bore diameter that is less than the turbine side bore diameter.

2. The system of claim 1 wherein the through bore of the sleeve comprises a counter bore disposed between a bearing assembly portion of the through bore that comprises the first inner diameter and another portion of the through bore that comprises the second, smaller inner diameter that accommodates the outer diameter of the seal portion of the shaft and turbine wheel assembly.

3. The system of claim 1 wherein the outer diameter of the outer race of the bearing assembly exceeds the outer diameter of the seal portion of the shaft and turbine wheel assembly.

4. The system of claim 1 wherein the bearing assembly comprises a set of compressor side rolling elements and a set of turbine side rolling elements.

5. The system of claim 4 wherein the sets of rolling elements contact the outer race.

6. The system of claim 4 wherein the bearing assembly comprises an inner race and wherein the rolling elements contact the inner race.

7. The system of claim 6 wherein a shaft portion of the shaft and turbine wheel assembly is press-fit to the inner race.

8. The system of claim 1 wherein the seal portion of the shaft and turbine wheel assembly comprises at least one annular groove.

9. The system of claim 8 comprising a seal component disposed in at least one of the at least one annular groove.

10. The system of claim 1 further comprising a compressor wheel attached to the shaft and turbine wheel assembly.

11. The system of claim 10 further comprising a compressor housing operatively coupled to the compressor side of the center housing.

12. The system of claim 1 further comprising a turbine housing operatively coupled to the turbine side of the center housing.

13. The system of claim 1 wherein the bore of the center housing comprises a counter bore that axially locates the sleeve.

* * * * *